US 6,555,033 B2

(12) United States Patent
Cargile et al.

(10) Patent No.: US 6,555,033 B2
(45) Date of Patent: *Apr. 29, 2003

(54) METHOD AND APPARATUS FOR MAKING A PLASTIC CONTAINER AND CLOSURE COMBINATION

(75) Inventors: David W. Cargile, Lititz, PA (US); Earle L. Ellis, York, PA (US); David Kesselman, York, PA (US); Roy N. Krohn, York, PA (US)

(73) Assignee: Graham Packaging Company, L.P., York, PA (US)

( * ) Notice: Subject to any disclaimer, the term of this patent is extended or adjusted under 35 U.S.C. 154(b) by 37 days.

This patent is subject to a terminal disclaimer.

(21) Appl. No.: 09/893,369

(22) Filed: Jun. 27, 2001

(65) Prior Publication Data

US 2003/0001316 A1 Jan. 2, 2003

(51) Int. Cl.$^7$ .............................................. B29C 49/04
(52) U.S. Cl. ................... 264/37.31; 264/527; 264/536; 264/540; 264/543
(58) Field of Search ................................. 264/527, 536, 264/540, 543, 37.31

(56) References Cited

U.S. PATENT DOCUMENTS

| 3,086,249 A | * | 4/1963 | Nelson et al. .............. 215/306 |
| 3,359,602 A | | 12/1967 | Bailey |
| 3,369,690 A | | 2/1968 | Hayes |
| 3,409,710 A | | 11/1968 | Klygis |
| 3,432,586 A | | 3/1969 | Stenger ........................ 264/94 |
| 3,679,785 A | | 7/1972 | Dike ........................... 264/98 |
| 3,802,823 A | | 4/1974 | Doughty et al. ......... 425/326 B |
| 3,862,698 A | | 1/1975 | Hafle |
| 3,983,199 A | | 9/1976 | Uhlig ........................... 264/89 |
| 4,082,827 A | | 4/1978 | Chlystun ..................... 264/98 |
| 4,733,801 A | * | 3/1988 | Scammell .................. 215/235 |
| 4,861,542 A | | 8/1989 | Shepps ....................... 264/542 |
| 5,044,923 A | | 9/1991 | Przytulla ..................... 425/525 |
| 5,165,558 A | | 11/1992 | Cargile .................... 215/100 R |
| 5,213,753 A | | 5/1993 | Przytulla ..................... 264/534 |
| 5,275,780 A | | 1/1994 | Robinson .................... 264/529 |
| 5,551,862 A | | 9/1996 | Allred, Jr. ................... 425/532 |
| 5,553,732 A | | 9/1996 | Kani .......................... 220/212 |
| 5,681,597 A | | 10/1997 | Aguilar et al. .............. 425/537 |
| 5,762,859 A | | 6/1998 | Kani .......................... 264/523 |
| 5,865,338 A | | 2/1999 | Conn .......................... 220/675 |
| 6,290,094 B1 | * | 9/2001 | Arnold et al. .............. 215/235 |

FOREIGN PATENT DOCUMENTS

WO        WO 97/32791        9/1997

OTHER PUBLICATIONS

Co–pending U.S. patent application No. 09/618,170 filed on Jul. 18, 2000, assigned to the assignee of the present application.

Co–pending U.S. patent application No. 09/877,892 filed on Jun. 8, 2001, assigned to the assignee of the present application.

* cited by examiner

Primary Examiner—Suzanne E. McDowell
(74) Attorney, Agent, or Firm—Howson and Howson

(57) ABSTRACT

At least one blow-molded plastic container and one compression molded lid are simultaneously produced in a blow mold. Preferably, the method and apparatus utilize a mold capable of simultaneously receiving a pair of extruded parisons. One of the parisons is utilized to produce a pair of aligned container bodies and the other of the parisons is utilized to form a pair of aligned closures. In this manner, a container and closure combination can be manufactured having perfect color matching and can be readily recycled in its entirety. In addition, the method and apparatus according to the present invention significantly reduces tooling costs and required machine capitol.

11 Claims, 4 Drawing Sheets

METHOD AND APPARATUS FOR MAKING A PLASTIC CONTAINER AND CLOSURE COMBINATION

FIELD OF THE INVENTION

The present invention relates to a method and apparatus for making a blow-molded plastic container and a corresponding closure, and more particularly, the present invention relates to an efficient method and apparatus for the simultaneous manufacture of blow-molded containers and compression-molded closures within blow molds.

BACKGROUND OF THE INVENTION

Various consumer products, such as beverage, food and other products, are packaged for sale in blow-molded plastic containers sealed with a plastic closure. Typically, the containers are mass produced in high speed rotary blow-molding machines, and the closures, such as caps and lids, are manufactured separately from the containers in injection molds. The separate manufacture of the containers and closures has a significant impact on the overall cost of mass producing the packages. These costs include manufacturing, tooling and material costs.

Another disadvantage of manufacturing containers and closures utilizing different molding processes is that such processes require the use of different plastic materials which results in the containers being made of one type of plastic material and the closures being made of another. Such a package complicates and increases the cost of recycling the containers and closures and does not readily permit precise color matching between the containers and closures. Thus, the separate manufacture of the containers and closures also has a negative impact on the aesthetic appearance of the package and its ability to be recycled in a cost-effective manner.

The above referenced problems are addressed in co-pending U.S. patent application Ser. No. 09/142,190 (now issued as U.S. Pat. No. 6,290,094) which is assigned to Graham Packaging Company, L.P., the assignee of the present application. The patent discloses a method of compression molding a closure in the flash material formed in an extrusion blow mold during the manufacture of a blow molded container. To this end, a tubular parison of molten thermoplastic material is extruded within a blow mold which has a container body cavity and an adjacent lid cavity. A lower section of the parison is received and blown in the container body cavity to form a blow-molded container body, and an upper adjacent section of the same parison is received and compressed in the lid cavity to form a compression molded lid for the blow molded container. A live hinge is formed between the lid and container so that the lid is tethered to the container and pivotable relative to the container between open and closed positions. Thus, the lid is formed in the blow mold from material which would otherwise form flash and be severed from the container and recycled as scrap material. This method provides a package which is of a consistent color throughout and which can be efficiently recycled in its entirety.

Graham Packaging Company, L.P. is also the assignee of co-pending U.S. patent application Ser. No. 09/618,170 which was filed on Jul. 18, 2000 and which discloses another method of forming a container and lid combination within a blow mold. The lid is formed utilizing a combination of blow-molding and compression molding techniques to provide a lid having a reinforced blow-molded central section and an outer peripheral compression-molded section. This method and lid structure permits the formation of closures which are manufactured in the so-called flash material within a blow mold and which are particularly useful in connection with wide mouth container bodies, such as tubs and the like.

Other examples of forming articles in the flash material compressed in blow molds include U.S. Pat. Nos. 4,082,827 issued to Chlystun; 5,165,558 issued to Cargile; 3,359,602 issued to Bailey; 3,369,690 issued to Hayes; 3,679,785 issued to Dike; 5,275,780 to Robinson; and 3,983,199 issued to Uhlig. The Chlystun patent discloses compression molding an integral pull tab; the Cargile patent discloses compression molding a breakaway measuring cup; and the Bailey, Hayes, Dike, Robinson and Uhlig patents disclose compression molding an integral handle.

In addition, other U.S. patents disclose the formation of blown closures within the container body cavity of a blow mold. To this end, the container body and closure are blown as a single intermediate body within a blow mold cavity. The blown intermediate article is then severed and trimmed to form a separate container body and closure. See for instance, U.S. Pat. Nos. 5,553,732 and 5,762,859 issued to Kani; 5,044,923 and 5,213,753 issued to Przytulla; 3,409,710 issued to Klygisis; and 5,865,338 issued to Conn.

A typical type of blow molding machine utilized to manufacture blow molded containers is a wheel blow molding machine which is vertically disposed and rotates about a horizontal axis. An example of such a machine is illustrated in FIG. 1 of U.S. Pat. No. 5,681,597 issued to Aguilar et al. and by the discussion provided in the Aguilar patent on column 2, line 52 to column 3, line 23. To this end, the blow molding machine has a plurality of molds positioned in a circular array following a circular path of motion. Each mold has a pair of mold halves which open to receive an extruded hollow parison, which close thereon so that the parison can be blown into conformance with the cavity defined by the mold, and which thereafter, open to release the blown article. All of these operations occur as the wheel continuously rotates at a constant speed, thereby forming and releasing blown articles in a continuous manner.

In an effort to increase the rate of manufacturing blown articles in a blow-molding machine, U.S. Pat. Nos. 3,432,586 issued to Stenger and 3,862,698 issued to Hafele disclose forming in each blow mold a pair of blown container bodies which are integrally connected by ring-shaped flash material. The flash material ring is severed from the containers to separate the containers into two identical separate container bodies. This concept can be utilized to effectively double the output of bottles that can be formed during each revolution of a wheel blow molding machine.

Further, it is also known to simultaneously extrude multiple separate parisons within a blow mold to simultaneously form multiple separate blown articles in each mold. For instance, see co-pending U.S. patent application Ser. No. 09/877,892 which was filed on Jun. 8, 2001 and which is assigned to Graham Packaging Corporation, L.P., and see U.S. Pat. Nos. 5,551,862 issued to Allred, Jr., 4,861,542 issued to Oles et al., and 3,802,823 issued to Doughty et al. The above referenced application discloses a blow mold capable of receiving a pair of simultaneously extruded parisons and capable of forming four blown bottles, two by two, within each mold. The molds are carried on a vertically disposed wheel blow molding machine having twenty-four identical such molds thereby forming 96 bottles per revolution of the wheel blow molding machine.

Although the above referenced container and closure combinations and/or the above referenced methods and apparatus for manufacturing containers and/or closures may function satisfactorily for their intended purposes, there is a need for a novel method and apparatus for the cost-effective manufacture of container and closure combinations. The container and lid combination should be capable of efficient and simultaneous manufacture in the same blow mold, should be readily recyclable, and should have substantially flawless color matching, if desired.

OBJECTS OF THE INVENTION

With the foregoing in mind, a primary object of the present invention is to provide a novel method for efficiently forming a plastic container and associated closure in the same blow mold utilizing a combination of blow molding and compression molding techniques.

Another object of the present invention is to a provide apparatus for making a plastic container and associated closure simultaneously in the same blow mold.

A further object of the present invention is to produce a complete package including a container body and closure at an increased production rate and with reduced machine capital and tooling costs.

Yet another object of the present invention is to a provide a complete package including container body and closure which have substantially perfect color matching and which are made of the same material enabling ready one step recycling of the entire package.

SUMMARY OF THE INVENTION

More specifically, the present invention provides a method of manufacturing a plastic container and closure combination in which at least one tubular parison of molten thermoplastic material is extruded into an open set of mold blocks. When closed, the mold blocks cooperate to form at least one container forming cavity spaced from at least one closure forming cavity. The set of mold blocks are closed to capture the at least one parison and a hollow container body is blow-molded within said container forming cavity while a closure is simultaneously compression-molded within the closure forming cavity. The container body has a finish and the closure is of a predetermined size for use in engaging the finish to seal the container body thereby forming an entire package.

Preferably, a first and second parison are simultaneously extruded into the open set of mold blocks, and the first parison is blow-molded in the container forming cavity and forms the blow-molded container body while a portion of the second parison is simultaneously compression molded in the closure forming cavity to form a compression-molded closure. In addition, preferably the set of mold blocks provide a pair of container forming cavities and a pair of closure forming cavities so that two blow-molded container bodies and two compression-molded closures are simultaneously formed in the set of mold blocks. In this case, the first parison is utilized to form the pair of container bodies and the second parison is utilized to form the pair of closures.

According to another aspect of the present invention, a novel apparatus for manufacturing plastic container and closure combinations is provided. The apparatus includes a set of mold blocks which, when closed, define at least a pair of separate, elongate, laterally spaced-apart, parison-receiving cavities. One of the parison-receiving cavities has at least one container body forming section and the other of the parison-receiving cavities has at least one closure forming section. The set of mold blocks are capable of simultaneously receiving and clamping on a pair of spaced-apart, simultaneously-extruded parisons such that at least a portion of one of the parisons is receivable in the container forming section for forming a blow-molded container body and at least a portion of the other of the parisons is simultaneously receivable in the closure forming section for simultaneously forming a compression molded closure in the set of mold blocks. Preferably, one of the parison-receiving cavities has a pair of container body forming sections and the other of the parison-receiving cavities has a pair of closure forming sections for simultaneously forming two separate container bodies and two separate closures.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED METHOD & APPARATUS

The present invention relates to a cost-effective method and apparatus for efficiently manufacturing a complete package including a plastic container and closure. The container and closure combinations can be utilized, for instance, to package food products, non-food products, or beverages such as yogurt drinks. The packages according to the present invention are produced in a novel manner which reduces required machine capital and tooling costs and which enables large quantities of the combinations to be manufactured at increased production rates.

Figure 1:
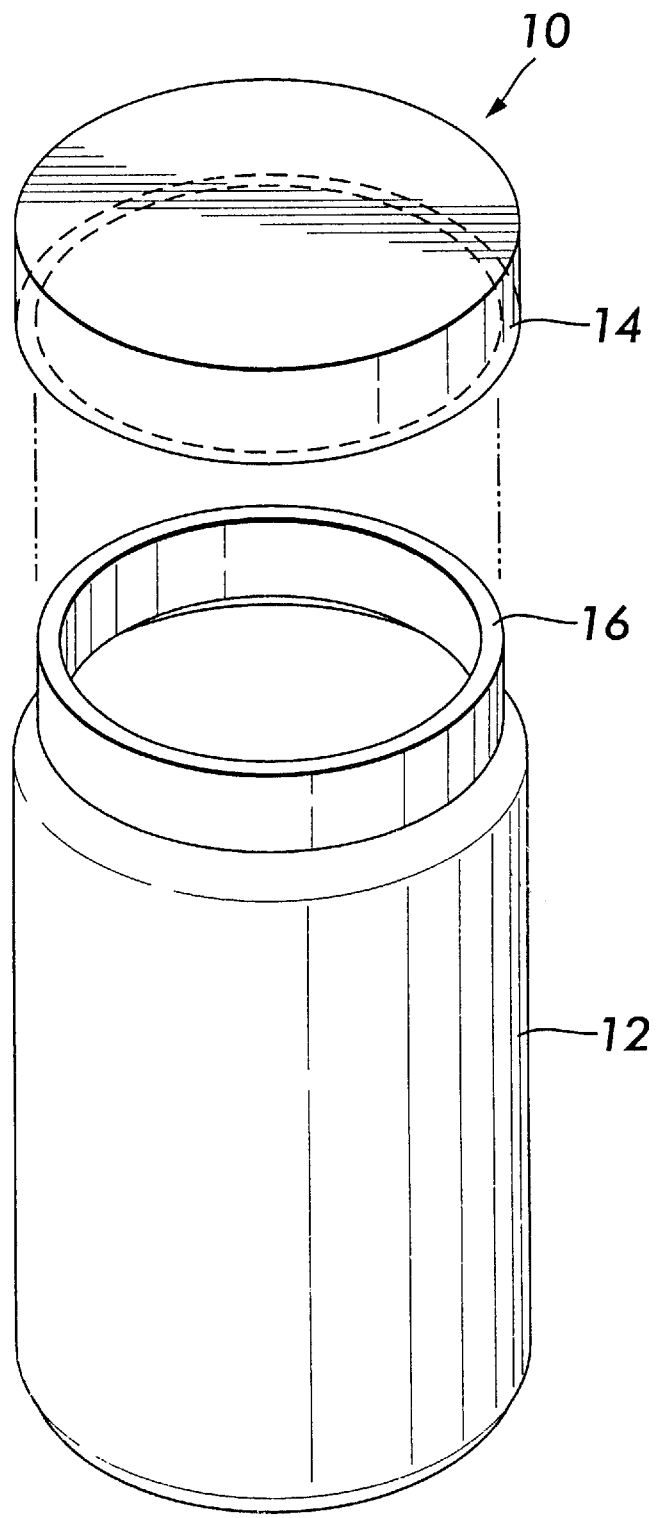
FIG. 1 is a perspective view of a package including a container body and lid embodying the present invention.

For purposes of illustration, FIG. 1 provides an example of a package 10 including a container body 12 and closure 14 which can be produced according to the present invention. The container body 12 is a hollow blow-molded article having an open finish 16 and a single, or multilayer, construction of a thermoplastic material. The closure 14 is compression molded of the same thermoplastic material of the container body 14, or of a different thermoplastic material. Examples of thermoplastic materials include HDPE, PP and LDPE which may, or may not, include embedded barrier or scrap layers. In one preferred embodiment of the present invention, the container bodies 12 and closures 14 are made of the same single layer material providing a package which is readily recyclable in its entirety.

While the container body 12 and closure 14 illustrated in the drawings are substantially cylindrical and without ornamentation, the package according to the present invention can be formed having any desired shape, size, profile or configuration. In addition, any closure-to-container securement mechanism can be utilized including, for instance, a closure and finish having cooperating threads, a closure and finish providing a friction fit, or a closure and finish which snap fit. Alternatively, a separate piece of film or shrink wrap (not shown) can be utilized to maintain the closure on the finish of the container until initial removal of the closure by a consumer. If desired, a sheet-like tamper-indication covering (not shown), such as wax paper, foil, or the like, can be sealed across the finish 16 after initial filling of the container body 12 to maintain the contents in a sterile environment and provide indication of tampering.

Figure 3:
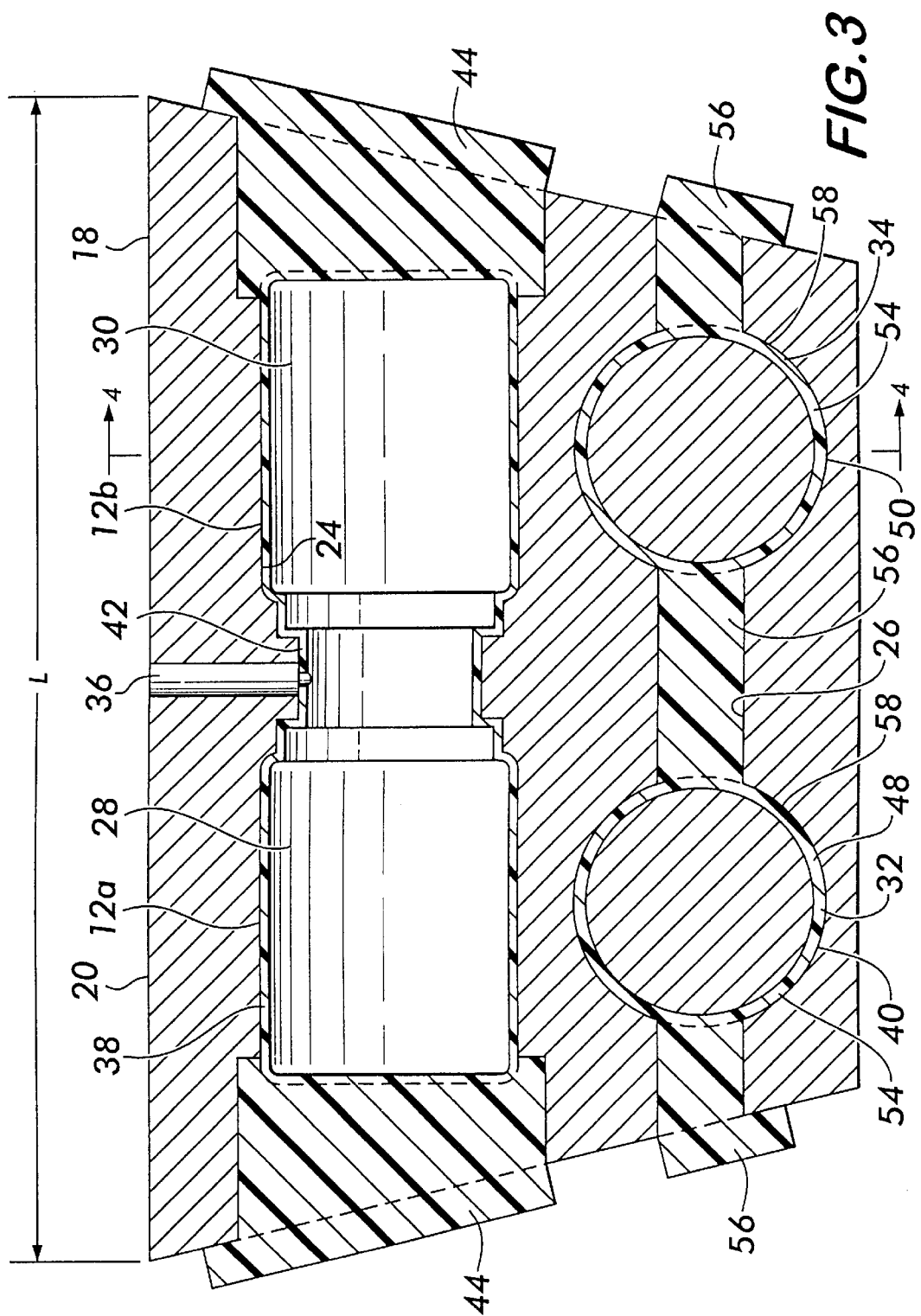
FIG. 3 is a cross-sectional view of a blow mold and a blown article and compression molded article located therein.
Figure 4:
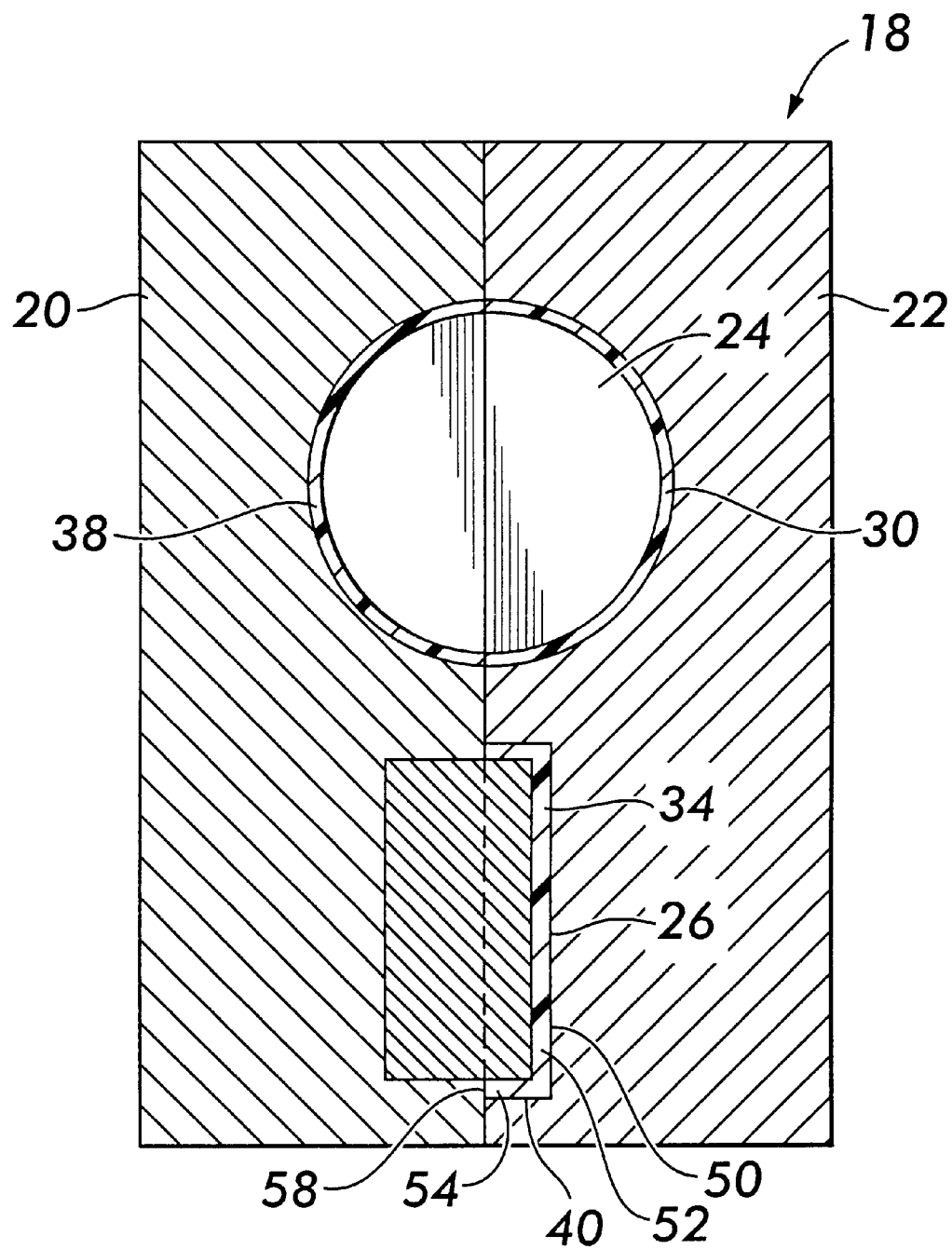
FIG. 4 is a cross-sectional view of the blow mold, blown article and compression-molded article along line 4—4 of FIG. 3.

As best illustrated in FIGS. 3 and 4, the present invention includes the use of a set 18 of mold block halves 20 and 22 which are capable of being opened and closed to receive and capture one or more extruded parisons. Preferably, the mating surfaces of the mold blocks 20 and 22 define a pair of separate, elongate, laterally spaced-apart, parison-receiving cavities, 24 and 26, which extend the length "L" of the mold blocks. In the preferred embodiment, the first, or outer, parison receiving cavity 24 has a pair of container body forming sections, 28 and 30, and the second, or inner, parison receiving cavity 26 has a pair of closure forming sections, 32 and 34. As will be discussed in detail, each set 18 of mold blocks 20 and 22, as illustrated, enables the simultaneous formation of a pair of separate container bodies 10 and a pair of separate closures 14.

Of course, other mold block configurations are contemplated. For instance, a set of mold blocks can be configured to receive one parison at a time, or alternatively, three or more parisons simultaneously. In addition, each set of mold blocks can be configured to have a single container body forming section and a single closure forming section, or three or more container body forming sections and three or more closure forming sections.

Preferably, the illustrated mold blocks, 20 and 22, are mounted on a vertically-disposed wheel blow molding machine (not shown) which includes an outer peripheral circular array of identical mold sets which follow a circular path of travel as the wheel blow molding machine continuously revolves at a constant speed. For example, the wheel could have twenty-four identical mold sets 18. Thus, as parisons are continuously extruded, the circular array of mold blocks sequentially receive and capture the parisons to provide a continuous high speed blow molding and compression molding process.

During wheel rotation, a mold set 18 is capable of opening to receive a pair of tubular parisons (not shown) extruded of molten thermoplastic material from a dual flowhead (not shown) and closing to confine the parisons within the first and second parison receiving cavities, 24 and 26. To this end, one parison is received in cavity 24 and the other parison is separately and simultaneously received in cavity 26. As the mold rotates further, a blow pin (not shown) is inserted into blow pin channel 36 to inflate the parison in the container forming sections 28 and 30. In addition, the mold blocks 20 and 22 clamp shut at a force sufficient to compression mold a pair of closures in the closure forming cavities 32 and 34. Thus, before one complete revolution of the wheel blow molding machine, the mold set 18 opens to release/eject a blown article 38 and compression-molded article 40. At the end of a full revolution, the mold set 18 is empty and in an open condition ready to receive another pair of parisons.

Figure 2:
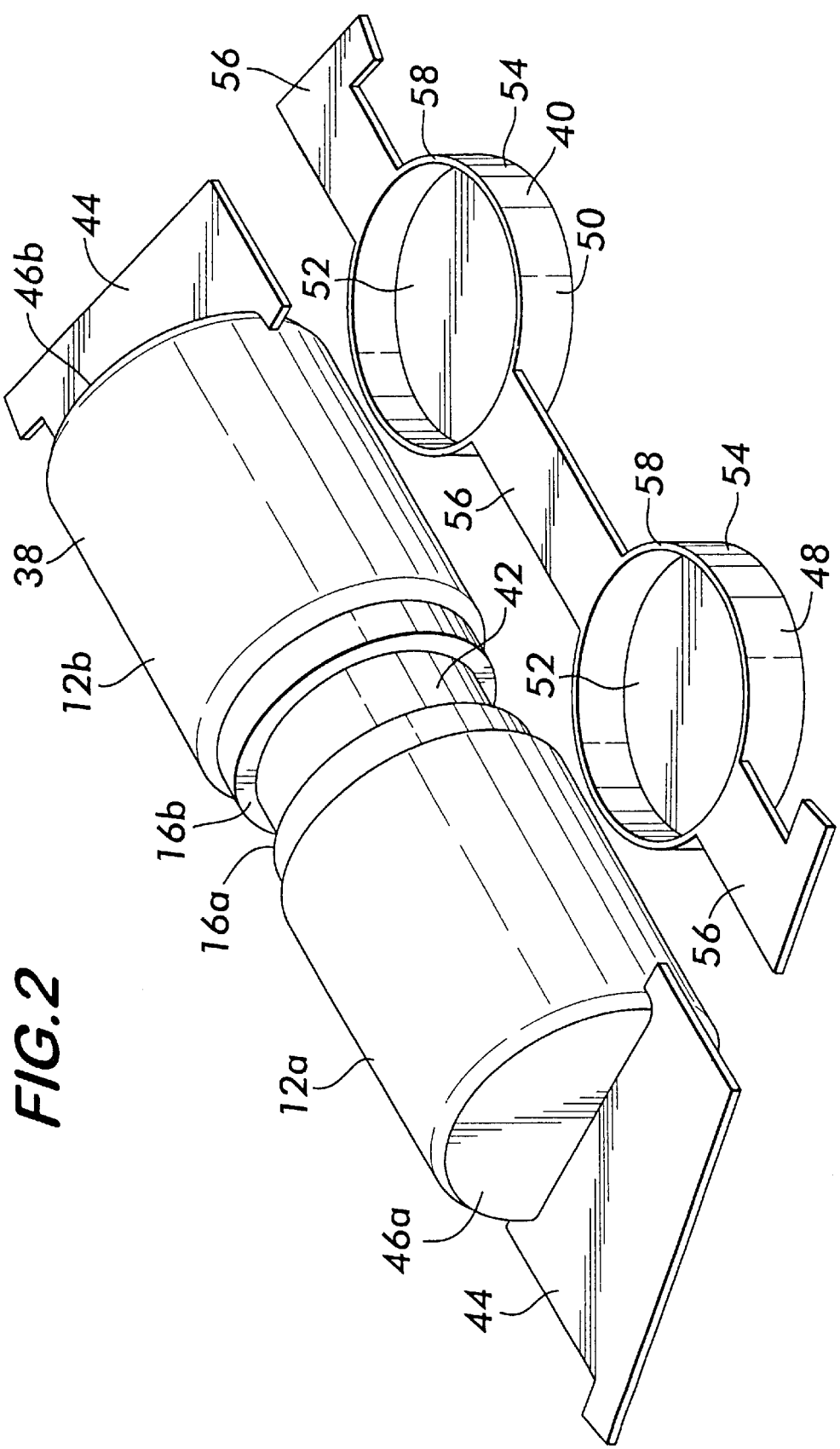
FIG. 2 is a perspective view of a blown article and compression molded article as ejected from a set of mold blocks before being subjected to trimming operations according to the present invention.

An example of the structure of the blown article 38 and compression molded article 40 produced by the above discussed mold set 18 is illustrated in FIG. 2. To this end, the blown article 38 includes a pair of lengthwise-aligned container bodies 12a and 12b having mouth finishes 16a and 16b facing each other. A ring-shaped piece of flash material 42 extends between the finishes and interconnects the container bodies 12a and 12b. In addition, flattened flash material 44 extends outwardly from each base 46a and 46b of the container bodies 12a and 12b along the mold parting line. The ring shaped flash material 42 and flattened flash material 44 are trimmed from the blown article 38 to form two separate container bodies 12.

The compression molded article 40 includes a pair of spaced apart compression molded closures 48 and 50 each having a flat top wall 52 and a depending peripheral skirt 54. The closures 48 and 50 are formed when the mold blocks 22 and 24 compress and flatten a tubular parison into the desired shape of the closure. The closures 48 and 50 are interconnected by flattened flash material 56 extending peripherally and outward from the lower rim 58 of the skirt 54 of each closure 48 and 50. The flash material 56 is trimmed from the closures 48 and 50 to provide a pair of separate closures 14 of a size for use on the container bodies 12.

With the foregoing in mind, the preferred method of the present invention includes the step of simultaneously extruding a pair of tubular parisons of molten thermoplastic material adjacent an open set 18 of mold blocks 20 and 22. The parisons extend parallel to each other and are spaced part a predetermined distance. The mold blocks 20 and 22, when closed, cooperate to form a pair of aligned container body forming cavities, 28 and 30, and a pair of aligned closure forming cavities, 32 and 34. The aligned pair of closure forming cavities, 32 and 34, are laterally offset from the aligned pair of container body forming cavities, 28 and 30.

The mold blocks close and capture the pair of parisons with one of the parisons extending within said pair of aligned container body cavities, 28 and 30, and the other of the parisons extending within the pair of aligned closure forming cavities, 32 and 34. The parison which extends within the pair of aligned container body forming cavities, 28 and 30, is inflated to form a hollow blow-molded article 38 while the parison which extends within the pair of aligned closure forming cavities, 32 and 34, is simultaneously compression molded to form a compression molded article 40. The blown article 38 includes a pair of blow-molded container bodies, 12a and 12b, and flash, 42 and 44, and the compression molded article 40 includes a pair of closures, 48 and 50, and flash 56.

The flash material 42, 44 and 56 is trimmed from the blown article 38 and the compression molded article 40 to provide two separate container bodies 12 which each having an open-mouth finish 16 and two separate closures 14 which are of a predetermined size for use in engaging the finishes 16 to seal the container bodies 12. The trimmed flash material 42, 44 and 56 of both the blown and compression molded articles, 38 and 40, is recycled and used to extrude more parisons.

Preferably, the pair of parisons are made of the same material thereby providing a complete package made of a single thermoplastic material. This ensures proper color matching and enables ready recycling of the entire package after use. Alternatively, the parisons can be made of different material so that the container bodies 12 are made of one type of thermoplastic material and the closures 14 are made of a different thermoplastic material.

Preferably, the method includes the use of a rotatable wheel blow-molding machine on which numerous identical mold sets 18 are mounted. To this end, the parisons are continuously extruded and sequentially received in the sets 18 of mold blocks 20 and 22 thereby providing a continuous container package forming process as the wheel rotates. At the end of the cycle for each mold set 18, the blown article 38 and compressed article 40 are simultaneously ejected from the mold blocks 20 and 22, and thereafter, supplied to a trimmer.

As stated previously, various modifications can be implemented to the above described method. For example, a single parison can be extruded and received within a blow mold having an aligned container body forming cavity and closure forming cavity. Alternatively, three or more parisons can be simultaneously extruded and received within a set of mold blocks defining any number of container body and closure cavities. Yet another alternative is the use of mold blocks which define any number of aligned cavities for simultaneously forming one, three, or more container bodies and closures.

Turning to the apparatus of the present invention, it includes the mold set 18 as previously described in detail. By way of example, preferably the mold blocks 20 and 22 are designed to provide a clamping force of 15,000 pounds to ensure the proper formation of the compression molded closures. In addition, preferably the apparatus includes a multi-parison flowhead (not shown) for simultaneously extruding at least a pair of elongate tubular parisons in a spaced-apart, side-by side manner within an open mold set 18. The flowhead is connected to a least one extruder (not shown) which supplies a molten thermoplastic material to the flowhead. Preferably, the extruder supplies a single type of thermoplastic material and the flowhead simultaneously extrudes multiple parisons made of the same material. Alternatively, multiple extruders can be connected to the flowhead to simultaneously extrude parisons made of different thermoplastic material.

The apparatus of the present invention can also includes a timing mechanism (not shown) to precisely control the opening and closing of the mold blocks and the insertion and retraction of the blow pins. In addition, the mold blocks can also include an ejection mechanism (not shown) for ejecting the compression molded closures from the mold at a predetermined time in the molding cycle.

Thus, the described method and apparatus for making container and closure combinations provide a unique and cost-effective package which can be entirely manufactured in a blow mold.

While a preferred method and apparatus have been described in detail, various modifications, alterations, and changes may be made without departing from the spirit and scope of the present invention as defined in the appended claims.

What is claimed:

1. A method of manufacturing a plastic container and closure combination, comprising the steps of:

extruding at least one tubular parison of molten thermoplastic material adjacent an open set of mold blocks which, when closed, cooperate to form at least one container forming cavity and at least one closure forming cavity, said cavities being spaced apart within said closed set of mold blocks;

closing said set of mold blocks to capture said at least one parison therein; and blow-molding a hollow container body within said container forming cavity and simultaneously compression molding a closure within said closure forming cavity, said container body having a finish and said closure being of a predetermined size for use in engaging said finish to seal said container body closed.

2. A method according to claim 1, wherein said step of extruding at least one parison includes simultaneously extruding a first and second parison within said open set of mold blocks, and wherein both parisons are received and captured within said set of mold blocks when closed.

3. A method according to claim 2, wherein a portion of said first parison is blow-molded in said container forming cavity and forms said blow-molded container body, and a portion of said second parison is simultaneously compression molded in said closure forming cavity to form said compression-molded closure.

4. A method according to claim 3, wherein said parisons, as extruded, extend parallel to one another and are spaced apart a predetermined distance.

5. A method according to claim 4, wherein said parisons are made of the same material.

6. A method according to claim 4, wherein said first parison is made of a different material than said second parison.

7. A method according to claim 3, wherein said set of mold blocks are mounted on a rotatable wheel apparatus with a plurality of identical sets of mold blocks and said first and second parisons are continuously extruded and sequentially received in said sets of mold blocks in a continuous manner as said wheel apparatus rotates.

8. A method according to claim 3, wherein said set of mold blocks form a pair of container forming cavities and a pair of closure forming cavities so that two blow-molded container bodies and two compression-molded closures are simultaneously formed in said set of mold blocks.

9. A method according to claim 8, wherein said first parison is utilized to form said two container bodies and said second parison is utilized to form said two closures.

10. A method according to claim 9, further comprising the steps of simultaneously ejecting said container bodies and closures from said mold blocks, and thereafter, trimming flash material extending above, below and between said container bodies and extending peripherally about said closures such that two separate container bodies and two separate closures are provided.

11. A method according to claim 10, further comprising the step of recycling said flash material trimmed from said container bodies with said flash material trimmed from said closures.

\* \* \* \* \*